United States Patent
Blasco Allue et al.

(10) Patent No.: US 7,234,043 B2
(45) Date of Patent: Jun. 19, 2007

(54) DECODING PREDICATION INSTRUCTIONS WITHIN A SUPERSCALER DATA PROCESSING SYSTEM

(75) Inventors: Conrado Blasco Allue, Austin, TX (US); Glen Andrew Harris, Austin, TX (US); Stephen John Hill, Austin, TX (US)

(73) Assignee: ARM Limited, Cambridge (GB)

( * ) Notice: Subject to any disclaimer, the term of this patent is extended or adjusted under 35 U.S.C. 154(b) by 289 days.

(21) Appl. No.: 11/072,644

(22) Filed: Mar. 7, 2005

(65) Prior Publication Data

US 2006/0200653 A1    Sep. 7, 2006

(51) Int. Cl.
G06F 9/44    (2006.01)

(52) U.S. Cl. .................................... 712/226
(58) Field of Classification Search ..................... None
See application file for complete search history.

(56) References Cited

U.S. PATENT DOCUMENTS

| | | | | |
|---|---|---|---|---|
| 5,799,180 A * | 8/1998 | Shiell et al. | ................. | 712/234 |
| 6,009,512 A * | 12/1999 | Christie | ....................... | 712/226 |
| 6,170,052 B1 * | 1/2001 | Morrison | .................... | 712/236 |
| 6,360,316 B1 * | 3/2002 | Baraz | ......................... | 712/226 |
| 6,442,679 B1 * | 8/2002 | Klauser et al. | ............. | 712/218 |
| 6,513,109 B1 * | 1/2003 | Gschwind et al. | .......... | 712/200 |
| 6,662,294 B1 * | 12/2003 | Kahle et al. | ................ | 712/226 |
| 6,918,032 B1 * | 7/2005 | Abdallah et al. | ........... | 712/234 |
| 7,085,919 B2 * | 8/2006 | Grochowski et al. | ....... | 712/226 |
| 7,143,270 B1 * | 11/2006 | Rudd et al. | ................. | 712/227 |
| 2004/0250051 A1 * | 12/2004 | Seal et al. | ................... | 712/226 |

OTHER PUBLICATIONS

Klauser, Artur, Austin, Todd, Grunwald, Dirk, Calder, Brad. "Dynamic Hammock Prediction for non-predicted instruction set architectures" Proceedings of the International Conference on Parallel Architectures and Compilation Techniques (PACT) 1998.*

Mahlke, Scott, Hank, Richard, McCormick, James, August, David, Hwu, Wen-mei. "A comparison of Full and Partial Predicted Execution Support of ILP Processors" ACM 1995.*

* cited by examiner

*Primary Examiner*—Eddie Chan
*Assistant Examiner*—Jacob Petranek
(74) *Attorney, Agent, or Firm*—Nixon & Vanderhye P.C.

(57) ABSTRACT

Within a multiple instruction pipeline data processing system which supports predication instructions, program instructions are initially decoded upon the assumption that they are predicated. A predication signal is generated within the instruction decoder stages when a predication instruction is detected. The presence or absence of this predication signal can then be used to correct any decoding which has been performed upon the basis of an assumption that the program instructions are predicated. The predication instruction can predicate a variable number of following instructions. The predication instruction can issue in parallel with an instruction which it predicates and yet the proper identification of the predication instruction need not be confirmed until at least some decoding has been performed upon the other program instruction.

11 Claims, 4 Drawing Sheets

DECODING PREDICATION INSTRUCTIONS WITHIN A SUPERSCALER DATA PROCESSING SYSTEM

BACKGROUND OF THE INVENTION

1. Field of the Invention

This invention relates to the field of data processing systems. More particularly, this invention relates to data processing systems which support predication instructions and which include multiple instruction pipelines.

2. Description of the Prior Art

It is known to provide data processing systems with multiple instruction pipelines such that instructions may be decoded and executed in the different instruction pipelines at the same time thereby increasing the speed of operation by increasing the overall instruction throughput. Such data processing systems are sometimes referred to as superscalar or multiple issue data processing systems.

It is also known to provide data processing systems which support predication instructions. One example of a predication instruction is the IT instruction of the Thumb-2 instruction set of the processors designed by ARM Limited Cambridge England. The IT predication instruction acts to render between one and four following unconditional program instructions to act as conditional program instructions which either are executed or are not executed in dependence upon condition codes specified in the IT instruction. This type of instruction is useful, for example, in an instruction set which does not provide condition codes for all instructions as a way of improving code density and as a way of providing condition code behaviour for certain sequences of instructions.

A particular problem arises with predication instructions in the context of processors having more than one instruction pipeline. When a predication instruction is being decoded in one instruction pipeline there may be another instruction being decoded in parallel in another instruction pipeline which is to be predicated by that predication instruction. However, the predication instruction will not be decoded and recognised until it has progressed a certain distance along its instruction pipeline and so it will not be known whether or not the instruction following in the sequence of program instructions but being processed in parallel with the predication instruction is or is not to be predicated until it has also progressed at least the same certain distance along its instruction pipeline. The way in which the instruction which may or may not be predicated is decoded is already dependent upon whether or not it is predicated at an early stage in its progress along the instruction pipeline, and the detection result of a predication instruction within its pipeline is not available sufficiently early to control this. It is undesirable to slow the instruction pipelines to a degree that would allow a predication instruction in one pipeline to be decoded and recognised as well as supplying a such recognition signal to another pipeline in sufficient time that the decoding in that other pipeline could also be completed within the required early decoding stage.

SUMMARY OF THE INVENTION

Viewed from one aspect the present invention provides apparatus for processing data under control of a sequence of program instructions including at least one predication instruction operable to predicate one or more subsequent program instructions to behave as predicated program instructions, said apparatus comprising:

a plurality of instruction pipelines operable to decode in parallel respective program instructions from said sequence of program instructions; wherein a first instruction pipeline of said plurality of instruction pipelines is operable upon receipt of a predication instruction to at least partially decode said predication instruction and to generate a predication signal indicating that one or more subsequent program instructions should be predicated by said predication instruction; and a second instruction pipeline of said plurality of instruction pipelines is operable upon receipt of a program instruction to at least partially decode said program instruction to generate at least some control signals values to control said apparatus to execute said program instruction with predication assuming that said program instruction is predicated by a predication instruction and then, if a predication signal is not received from said first instruction pipeline to indicate that said program instruction is predicated, to modify said control signal values to control said apparatus to execute said program instruction without predication.

This technique addresses the above problem by decoding a program instruction which may or may not be predicated upon the assumption that it is predicated. Then, if a predication signal indicating that a preceding (older) program instruction does indeed predicate the program instruction decoded upon the basis of assumed predication is not received, then the decoding into control signals is modified to correspond to the program instruction not being predicated. Since the behaviour of the program instruction when it is not predicated is simplier than when it is predicated, the modification may be achieved relatively quickly and simply since certain of the control signal values which have multiple possible values for a predicted instruction may be mapped to a fixed value when the instruction is not predicated The control signal values corresponding to the partial or full decoding of a non-predicated program instruction can be considered to be a subset of the possible control signals corresponding to a partial or full decoding of the same program instruction when it is predicated. The mapping from many-to-one is possible, whereas a mapping from one-to-many is not.

Within a system in which the first instruction pipeline and the second instruction pipeline each have multiple decode stages, the predication signal and the control signal values produced on the assumption of predication may be generated in respective ones of these decoding stages with the predication signal being transmitted from the first instruction pipeline to the second instruction pipeline and the control signal values being modified in a following pipeline stage of the second instruction pipeline.

The predication signal produced in the first instruction pipeline as well as being transmitted to the second instruction pipeline may also be used to predicate following instructions in the first instruction pipeline itself as well as later instructions within the second instruction pipeline.

A finite state machine within the system may advantageously be used to respond to detection of a predication instruction to generate a predication signal over a required number of processing cycles as necessary to signal the predication of following program instructions.

The predication instruction may predicate the subsequent instructions in a variety of different ways, such as inhibiting flag setting, etc. However, the technique is useful in embodiments in which the predication instruction serves to predicate subsequent instructions to be executed as conditional program instructions.

The control signal values produced by the decoding of the program instruction assuming it is predicated may be modified in a variety of different ways when that assumption is not confirmed. Particular preferred ways in which such modification may be performed are ones in which the signals modified control which operand registers are accessed during execution and the timings of when operands are forwarded between instruction pipelines during execution of program instructions. Operand forwarding is a technique whereby data dependencies between instructions may be accommodated without requiring dependent instructions to be delayed from being passed along their pipeline until their input operands are fully known.

Whilst it will be appreciated that the present technique could be used in systems including more than two instruction pipelines, the technique is well suited to a two instruction pipeline embodiment and an in order superscalar microprocessor in particular.

Viewed from another aspect the present invention provides apparatus for processing data under control of a sequence of program instructions including at least one predication instruction operable to predicate one or more subsequent program instructions to behave as predicated program instructions, said apparatus comprising:

a plurality of instruction pipeline means for decoding in parallel respective program instructions from said sequence of program instructions; wherein upon receipt of a predication instruction a first instruction pipeline means of said plurality of instruction pipeline means at least partially decodes said predication instruction and to generate a predication signal indicating that one or more subsequent program instructions should be predicated by said predication instruction; and upon receipt of a program instruction a second instruction pipeline means of said plurality of instruction pipeline means at least partially decodes said program instruction to generate at least some control signals values to control said apparatus to execute said program instruction with predication assuming that said program instruction is predicated by a predication instruction and then, if a predication signal is not received from said first instruction pipeline means to indicate that said program instruction is predicated, to modify said control signal values to control said apparatus to execute said program instruction without predication.

Viewed from a further aspect the present invention provides a method of processing data under control of a sequence of program instructions including at least one predication instruction operable to predicate one or more subsequent program instructions to behave as predicated program instructions, said method comprising the steps of:

decoding in parallel in a plurality of instruction pipelines operable respective program instructions from said sequence of program instructions; wherein upon receipt of a predication instruction, a first instruction pipeline of said plurality of instruction pipelines at least partially decodes said predication instruction and generates a predication signal indicating that one or more subsequent program instructions should be predicated by said predication instruction; and upon receipt of a program instruction, a second instruction pipeline of said plurality of instruction pipelines at least partially decodes said program instruction to generate at least some control signals values to control said apparatus to execute said program instruction with predication assuming that said program instruction is predicated by a predication instruction and then, if a predication signal is not received from said first instruction pipeline to indicate that said program instruction is predicated, modifies said control signal values to control said apparatus to execute said program instruction without predication.

The above, and other objects, features and advantages of this invention will be apparent from the following detailed description of illustrative embodiments which is to be read in connection with the accompanying drawings.

DESCRIPTION OF THE PREFERRED EMBODIMENTS

Figures 1, 2:
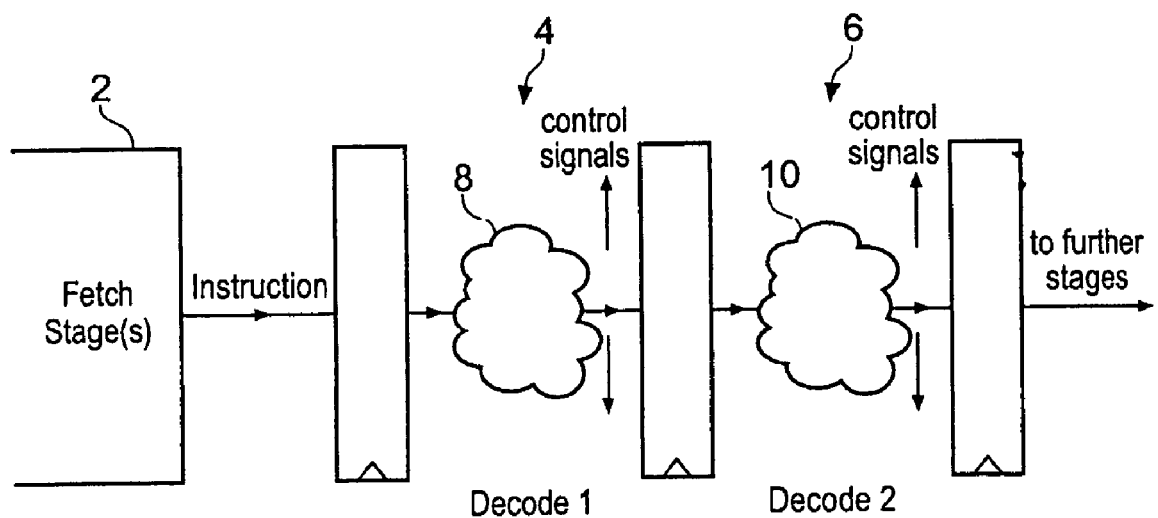
FIG. 1 schematically illustrates a sequence of program instructions including a predication instruction which predicates several following program instructions.
FIG. 2 schematically illustrates an instruction pipeline.

FIG. 1 schematically illustrates a sequence of program instructions. This sequence of program instructions may, for example, be Thumb-2 instructions as previously mentioned. These instructions do not all contain condition codes and accordingly can be considered to be inherently unconditional instructions. However, the Thumb-2 instruction set includes the IT instruction which acts as a predication instruction. The IT instruction renders conditional the operation of between one and four subsequent instructions. The IT instruction specifies condition codes for use in determining whether or not the predicated following instructions will or will not be executed. The IT instruction also specifies for the required number of predicated instructions which follow it whether they will be executed if the specified condition codes are met or alternatively whether they will be executed when the required condition codes are not met (i.e. giving an if/then/else type of behaviour).

It will be appreciated that the sequence of program instructions illustrated in FIG. 1 when being executed by a superscalar processor will result in different instructions being issued into different instruction pipelines and processed in parallel. In this example the system is an in-order decoding processor and in addition instructions are issued into the instruction pipeline for execution strictly in the order in which they appear in the program sequence of FIG. 1. It is however possible that instructions are decoded in order and issued for execution out-of-order.

The IT instruction issued into a first instruction pipeline will be followed by the instruction UNCOND3 issued into a second instruction pipeline. These two instructions proceed in parallel down their respective instruction pipelines. Immediately following these instructions are UNCOND4 in the first instruction pipeline and UNCOND5 in the second instruction pipeline. The above assumes that there are no data hazards between the instructions which prevent them being issued in parallel. If hazards arise which cannot be overcome by appropriate operand forwarding between the instruction pipelines, then only a single instruction will be issued at a time into one of the instruction pipelines so that the hazard may be avoided at the cost of a reduction in the amount of parallel processing achieved. The IT instruction illustrated in FIG. 1 may predicate between one and four subsequent instructions.

FIG. 2 schematically illustrates a portion of an instruction pipeline including two decode stages. A program instruction is fetched by one or more fetch stages 2 (or from instruction cache) (this may in practice be a combined fetch unit to allow for co-ordination of instruction issue between multiple pipelines). This instruction is a compact encoding of the desired processing operation, such as a 32-bit ARM instruction or a 16/32-bit Thumb-2 instruction. These instructions are decoded in the decode stages 4, 6 using decode logic 8, 10 into control signals having control signal values which are supplied to the different processing circuits within the processor as a whole to control their operation. These control signals effectively configure the circuits to perform the processing operation specified by the processing instruction concerned. The control signals are relatively large in number compared to the bit-width of the program instructions and there may be, for example, more than 100 control signals generated in the decoding stages 4, 6 from a 16-bit input program instruction word. The multiple decoding stages 4, 6 each perform part of the decoding. Dividing the decoding work between multiple decode stages is conventional in pipelined processing systems.

The predication of a program instruction which may or may not be predicated due to a preceding predication instruction will influence how the decode stage 4 decodes the input program instruction to produce its control signal values. If the predication instruction which may or may not predicate that particular program instruction within the decode stage 4 is progressing in parallel along a different instruction pipeline, then the identification of the that predication instruction as a predication instruction does not occur until the decode logic 8 within the decode stage 4 has already been required to generate its control signal values as outputs. Slowing down the operation of the decoding stages to allow sufficient time for identification of a predication instruction from a different program instruction pipeline to be forwarded to the decode logic 8 would be a significant disadvantage. Accordingly, the decode logic 8 decodes the program instructions it receives on the assumption that they are predicated as a result of a preceding predication instruction. The output of the second decode stage 6 is output to further stages, such as execution and write back stages or other decode stages.

Figure 3:
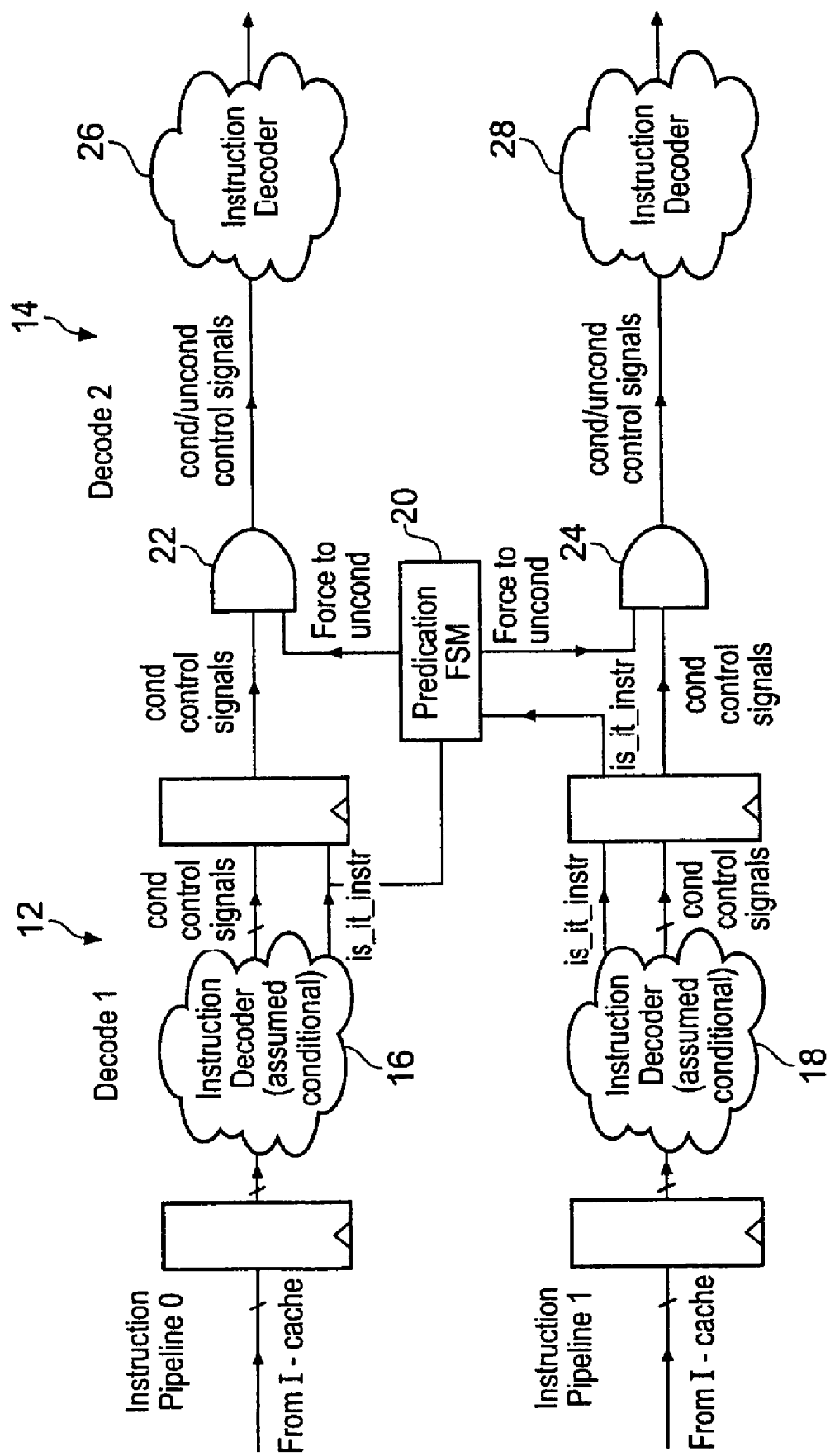
FIG. 3 schematically illustrates two instruction pipelines for decoding predication instructions and subsequent instructions which may or may not be predicated.

FIG. 3 schematically illustrates two decode stages 12, 14 within two instruction pipelines, pipeline 0 and pipeline 1. Each of these pipelines receives the program instruction from, for example, an instruction cache (or a fetch unit) and passes this to respective instruction decoder logic 16, 18. This instruction decoder logic 16, 18 decodes the received program instruction on the assumption that it is predicated by an IT instruction and is accordingly conditional. The decoding performed will be a partial decoding producing control signal values to be passed to the second decode stage 14. The instruction decoder logic 16, 18 also serves to identify if the program instruction it is decoding is a predication instruction (an IT instruction) and if so asserts a predication signal is_IT_instr which is also passed to the second decoder stage 14. In the case of pipeline 0 the is_IT_instr signal is passed directly to the following stage to allow a finite state machine 20 to change state time to modify the control signals being decoded in pipeline 1 in the following cycle.

Within the second decoder stage 14 the finite state machine 20 is responsive to the predication signals is_IT-_instr received from the first decoder stages 12 to note the occurrence of a predication instruction (IT instruction) in either of the instruction pipelines. If such a predication instruction is detected, then the subsequent following program instructions which are predicated by that predication instruction can be allowed to progress leaving in place the decoding based on the assumption that they are conditional. There are a variable number of such predicated following program instructions and the number of these is encoded within the IT instruction and accordingly the finite state machine 20 is responsive to a decoding of this number from the IT instruction to allow the assumed conditional decoding to proceed for the specified number of subsequent program instructions.

If the predication finite state machine 20 does not receive a predication signal from either of the instruction pipelines, then the assumption that the program instructions decoded by the instruction decoder project 16, 18 are conditional which has been made will be incorrect. Accordingly, logic gates 22, 24 (schematically illustrated as AND gates, but in practice having a variety of different forms depending on the correction that is required) are provided and are responsive to a signal generated by the predication finite state machine 20 to modify the control signal values received from the first decoder stage 12 to correct the assumption that those program instructions are predicated and instead rendered them into a form consistent with them being unconditional. (In other embodiments additional decoding could take place between the latch at the end of the first decode and the logic gates 22, 24). The unconditional form of the control signals resulting from the decoding produced by the first decoder stage 12 is suitable for a many-to-one mapping from the control signal values which are produced on the assumption that those program instructions are predicated and accordingly the forcing of the control signal values to the unconditional states can be performed relatively rapidly before further instruction decoding is performed by instruction decoder logic 26, 28 within the second decoder stage 14. In the case that the program instruction are in fact predicated, this further decoding performed by the instruction decoder logic 26, 28 among other tasks serves to add the condition code specifying control signal values into the decoding as derived from the predication instruction (IT instruction) which has been identified. Thus, whilst the decoding produced by the first decoder stage 12 assumes that the program instructions are conditional, it does not necessarily include all of the required control signal values which will be necessary to perform conditional execution. However, allowing the decoding in the first decoder stage 12 to proceed without requiring it to wait for determination of whether the program instruction is or is not predicated eases timing difficulties and may be relatively rapidly corrected if the assumption of predication is not in fact correct. By the time the control signal values emerge from the second decoder stage 14 they are correctly identified as either predicated or non-predicated and may proceed to further decoding stages or further other types of stage, such as execution and write back.

FIG. 3 illustrates how the predication instruction may be identified in either of the two instruction pipelines and its presence signalled to the predication finite state machine 20. The predication finite state machine 20 can then correct the assumed decoding which has been performed upon a program instruction which is proceeding in parallel. The correction may also be applied to appropriately predicate or not predicate program instructions which follow the predication instruction and are specified by the predication instruction as being predicated.

Figure 4:
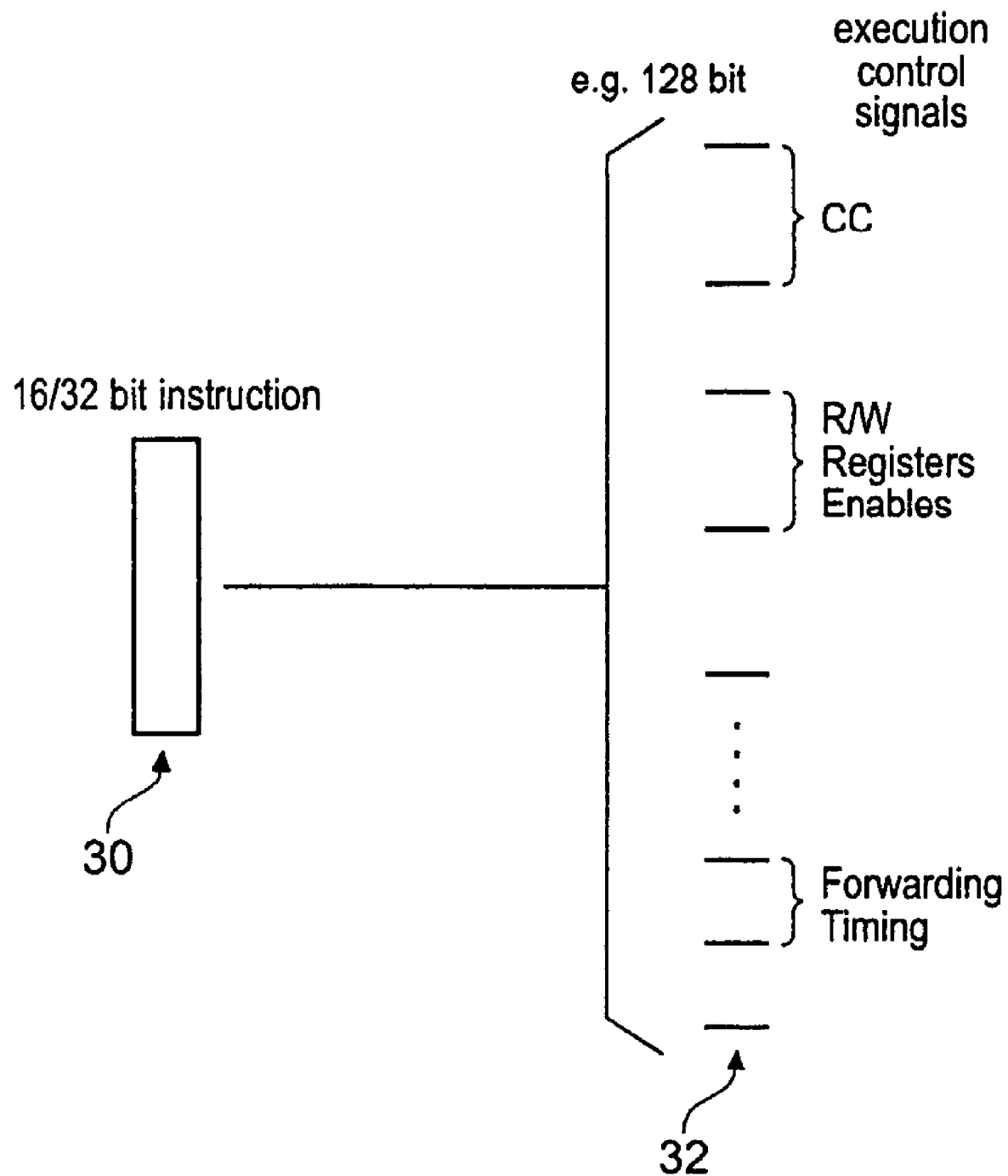
FIG. 4 illustrates control signal values which may be generated by the decoding of a program instruction.

FIG. 4 schematically illustrates the conversion of a program instruction 30 into control signal values 32. The control signal values control various aspects of the configuration of the data processing system to execute the program instruction concerned. In the example of FIG. 4, the control signal values are 128-bits wide. Within these control signal values are various fields, including field specifying condition codes CC associated with the program instruction concerned to control whether or not it will or will not be executed depending upon processing flags set as a result of preceding program instructions. Another field within the control signal values provides enable signals for registers to be read from or written to by that program instruction. There will additionally be signals specifying which are the registers within a register bank to serve as source registers or destination registers. A conditional program instruction will in this example embodiment access more program registers than an unconditional instruction (e.g. to allow for state recovery should it be determined late that a condition code fail has occurred resulting in that instruction not executing from an architectural viewpoint). Also included within the control signal values are one or more fields specifying forwarding timing for destination values generated by execution of the program instruction concerned. Destination values may be available early in the execute stages or only at the end of the execute stages or somewhere in between. Depending upon when such destination values are available, it is possible to forward them from one instruction pipeline to another instruction pipeline so as to address read-after-write constraints. This forwarding timing can vary in dependence upon whether or not the program instruction is or is not conditional, e.g. whether or not the condition codes are met may not be available until late in execute stages beyond the point at which the destination values would otherwise normally be available in the case of an unconditional instruction.

Figure 5:
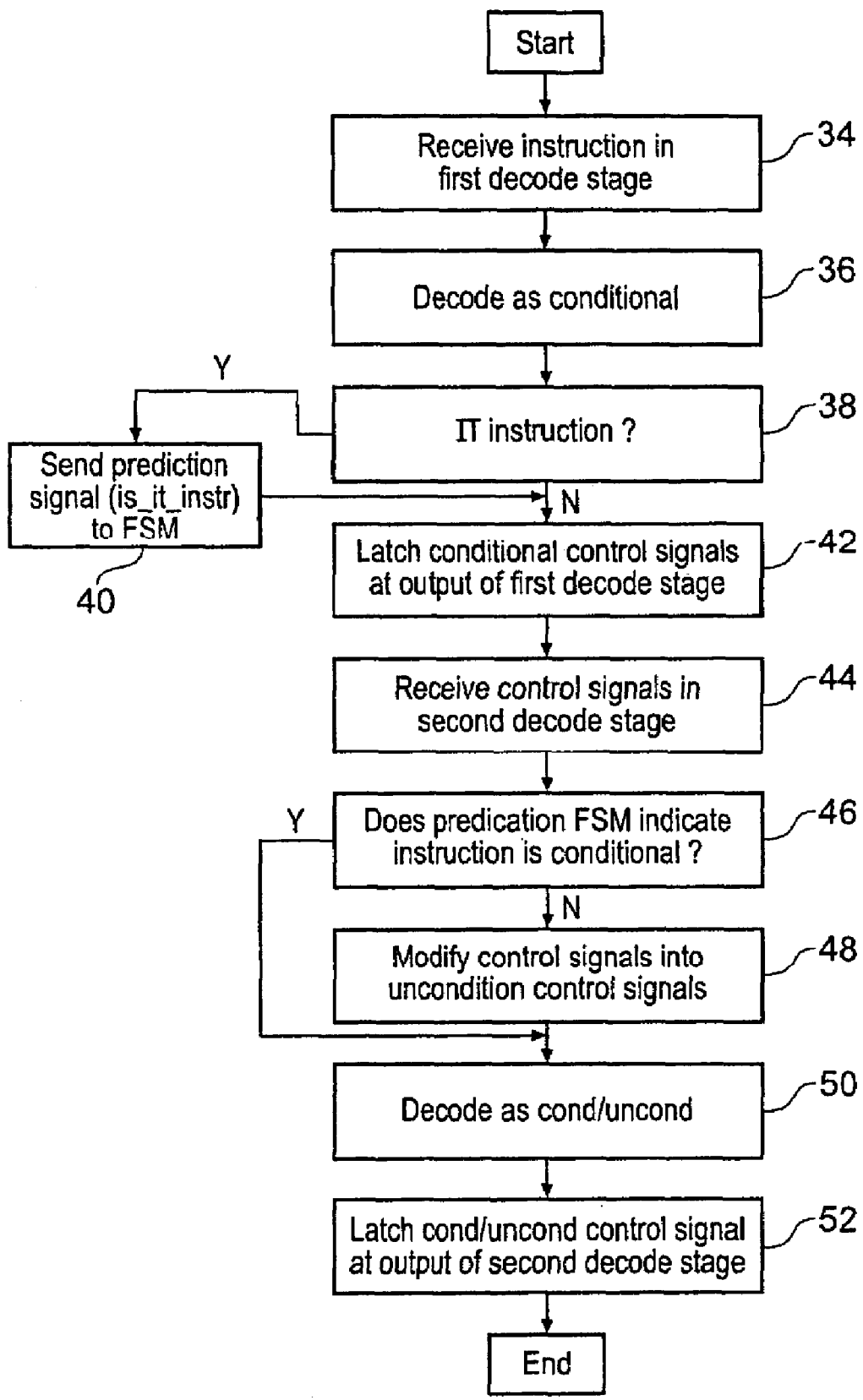
FIG. 5 is a flow diagram schematically illustrating the operation of one of the instruction pipelines of FIG. 3.

FIG. 5 is a flow diagram schematically illustrating the operation of the decode stages of one instruction pipeline of the example of FIG. 3. At step 34 a program instruction is received in a first decoder stage. At stage 36 this program instruction is decoded on the assumption that it is conditional. Step 38 serves to identify whether the program instruction concerned is a predication instruction (IT instruction). If the program instruction is a predication instruction, then processing proceeds to step 40 at which predication signal is generated and sent to a predication finite state machine 20 as previously described. If the decoded instruction is not a predication instruction, then step 40 is bypassed.

Step 42 serves to latch the control signal values generated by the first decoder stage as the output of the first decoder stage. These control signal values have values consistent with the program instruction being predicated/conditional.

At step 44 the control signal values from the first decoder stage are received in the second decoder stage to be subject to further decoding. Step 46 determines whether the predication finite state machine 20 is indicating that the program instruction concerned is truly conditional. This indication by the finite stage machine 20 will be dependent upon whether or not a predication signal has been detected in a neighbouring instruction pipeline or within the same instruction pipeline for a preceding (older) instruction and indicating that the program instruction concerned is predicated by that predication instruction.

If the determination at step 46 is that the program instruction is not conditional, then step 48 modifies the control signal values concerned into an unconditional form. This can involve suppressing certain register access enable signals and altering forwarding timing signals as well as other fields within the control signal values. If the assumption that the program instruction is conditional was correct, then step 48 is bypassed.

Step 50 serves to further decode the control signal values at that point which will now have values correctly representing whether or not the program instruction is predicated or not predicated. At step 52 the output control signal values from the second decoder stage are latched ready for passing to further pipeline stages, e.g. further decoder stages or stages such as execution and write back.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data under control of a sequence of program instructions including at least one predication instruction operable to predicate one or more subsequent program instructions to behave as predicated program instructions, said apparatus comprising:
   a plurality of instruction pipelines operable to decode in parallel respective program instructions from said sequence of program instructions; wherein
   a first instruction pipeline of said plurality of instruction pipelines is operable upon receipt of a predication instruction to at least partially decode said predication instruction and to generate a predication signal indicating that one or more subsequent program instructions should be predicated by said predication instruction; and
   a second instruction pipeline of said plurality of instruction pipelines is operable upon receipt of a program instruction to at least partially decode said program instruction to generate at least some control signals values to control said apparatus to execute said program instruction with predication assuming that said program instruction is predicated by a predication instruction and then, if a predication signal is not received from said first instruction pipeline to indicate that said program instruction is predicated, to modify said control signal values to control said apparatus to execute said program instruction without predication.

2. Apparatus as claimed in claim 1, wherein said first instruction pipeline and said second instruction pipeline each have multiple decode stages, said predication signal and said control signal values being generated in respective decode stages of said first instruction pipeline and said second instruction pipeline, said predication signal being transmitted from said first instruction pipeline to said second instruction pipeline in a following decode stage of said first instruction pipeline and said control signal values being modified in a following decode stage of said second instruction pipeline.

3. Apparatus as claimed in claim 1, wherein said first instruction pipeline is operable upon receipt of a program instruction to at least partially decode said program instruction to generate control signal values to control said apparatus to execute said program instruction with predication assuming that said program instruction is predicated by a predication instruction and then, if a predication signal is not present to indicate that said program instruction is predicated by a predication instruction preceding said program instruction in said first instruction pipeline, to modify said control signal values to control said apparatus to execute said program instruction without predication.

4. Apparatus as claimed in claim 1, comprising a finite state machine responsive to detection of said predication instruction in one of said plurality of instruction pipelines to generate said predication signal over one or more processing cycles to predicate one or more program instructions following said predication instruction in said sequence of program instructions.

5. Apparatus as claimed in claim 1, wherein said predication instruction predicates one or more subsequent program instruction by controlling said one or more subsequent program instructions to be executed as conditional program instructions.

6. Apparatus as claimed in claim 1, wherein said control signal values include one or more signal values controlling which operand registers are accessed during instruction execution.

7. Apparatus as claimed in claim 1, wherein said control signal values include one or more signal values specifying operand forwarding timing to be used during instruction execution.

8. Apparatus as claimed in claim 1, wherein said plurality of instruction pipelines comprise two instruction pipelines.

9. Apparatus as claimed in claim 1, wherein said apparatus comprises a multiple instruction issue microprocessor.

10. Apparatus for processing data under control of a sequence of program instructions including at least one predication instruction operable to predicate one or more subsequent program instructions to behave as predicated program instructions, said apparatus comprising:

a plurality of instruction pipeline means for decoding in parallel respective program instructions from said sequence of program instructions; wherein upon receipt of a predication instruction a first instruction pipeline means of said plurality of instruction pipeline means at least partially decodes said predication instruction and to generate a predication signal indicating that one or more subsequent program instructions should be predicated by said predication instruction; and upon receipt of a program instruction a second instruction pipeline means of said plurality of instruction pipeline means at least partially decodes said program instruction to generate at least some control signals values to control said apparatus to execute said program instruction with predication assuming that said program instruction is predicated by a predication instruction and then, if a predication signal is not received from said first instruction pipeline means to indicate that said program instruction is predicated, to modify said control signal values to control said apparatus to execute said program instruction without predication.

11. A method of processing data under control of a sequence of program instructions including at least one predication instruction operable to predicate one or more subsequent program instructions to behave as predicated program instructions, said method comprising the steps of:

decoding in parallel in a plurality of instruction pipelines operable respective program instructions from said sequence of program instructions; wherein upon receipt of a predication instruction, a first instruction pipeline of said plurality of instruction pipelines at least partially decodes said predication instruction and generates a predication signal indicating that one or more subsequent program instructions should be predicated by said predication instruction; and upon receipt of a program instruction, a second instruction pipeline of said plurality of instruction pipelines at least partially decodes said program instruction to generate at least some control signals values to control said apparatus to execute said program instruction with predication assuming that said program instruction is predicated by a predication instruction and then, if a predication signal is not received from said first instruction pipeline to indicate that said program instruction is predicated, modifies said control signal values to control said apparatus to execute said program instruction without predication.

* * * * *